US009323846B2

(12) United States Patent
Jeh et al.

(10) Patent No.: US 9,323,846 B2
(45) Date of Patent: *Apr. 26, 2016

(54) METHOD, SYSTEM, AND GRAPHICAL USER INTERFACE FOR ALERTING A COMPUTER USER TO NEW RESULTS FOR A PRIOR SEARCH

(71) Applicant: Google Inc., Mountain View, CA (US)

(72) Inventors: Glen M. Jeh, San Francisco, CA (US);
Beverly Yang, San Francisco, CA (US)

(73) Assignee: Google Inc., Mountain View, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/179,721

(22) Filed: Feb. 13, 2014

(65) Prior Publication Data
US 2014/0164347 A1    Jun. 12, 2014

Related U.S. Application Data

(63) Continuation of application No. 13/043,400, filed on Mar. 8, 2011, now Pat. No. 8,694,491, which is a continuation of application No. 11/323,096, filed on Dec. 30, 2005, now Pat. No. 7,925,649.

(51) Int. Cl.
G06F 17/30    (2006.01)

(52) U.S. Cl.
CPC .... G06F 17/30864 (2013.01); G06F 17/30867 (2013.01)

(58) Field of Classification Search
CPC ............ G06F 17/301; G06F 17/30126; G06F 17/3064; G06F 17/30864; G06F 17/30873; G06F 17/30616; G06F 17/30705; G06F 17/30722; G06F 17/2785; G06F 17/30539; G06F 17/30554; G06F 17/30675
See application file for complete search history.

(56) References Cited

U.S. PATENT DOCUMENTS

| 5,724,567 A | 3/1998 | Rose et al. |
| 5,754,939 A | 5/1998 | Herz et al. |
| 6,038,574 A | 3/2000 | Pitkow et al. |

(Continued)

FOREIGN PATENT DOCUMENTS

| EP | 1050830 | 11/2000 |
| WO | 02/37851 | 5/2002 |
| WO | 2005/033979 | 4/2005 |

OTHER PUBLICATIONS

Aktas, M.S., et al., "Using Hyperlink Features to Personalize Web Search," Computer Science Dept., School of Informatics, Indiana University, 2005.

(Continued)

*Primary Examiner* — Angelica Ruiz
(74) *Attorney, Agent, or Firm* — Fish & Richardson P.C.

(57) ABSTRACT

A method, system, and graphical user interface for alerting a computer user to new results for a prior search are disclosed. One aspect of the invention involves a graphical user interface on a computer that includes a plurality of links recommended by a search engine for a computer user. The plurality of links are determined by the search engine by: producing search results by rerunning a plurality of search queries that have been performed previously for the computer user, and evaluating the produced search results to select search results that meet predefined search result selection criteria. At least one of the criteria is based on Internet usage data for the user.

22 Claims, 8 Drawing Sheets

(56) References Cited

U.S. PATENT DOCUMENTS

| | | | |
|---|---|---|---|
| 6,131,110 A | 10/2000 | Bates et al. | |
| 6,175,824 B1 | 1/2001 | Breitzman et al. | |
| 6,182,091 B1 | 1/2001 | Pitkow et al. | |
| 6,202,058 B1 | 3/2001 | Rose et al. | |
| 6,285,999 B1 | 9/2001 | Page | |
| 6,349,307 B1 | 2/2002 | Chen | |
| 6,356,922 B1 | 3/2002 | Schilit et al. | |
| 6,381,594 B1 | 4/2002 | Eichstaedt et al. | |
| 6,385,619 B1 | 5/2002 | Eichstaedt et al. | |
| 6,411,950 B1 | 6/2002 | Moricz et al. | |
| 6,460,029 B1 | 10/2002 | Fries et al. | |
| 6,484,161 B1* | 11/2002 | Chipalkatti et al. | |
| 6,510,424 B1 | 1/2003 | Ford et al. | |
| 6,513,026 B1 | 1/2003 | Horvitz et al. | |
| 6,549,941 B1 | 4/2003 | Jaquith et al. | |
| 6,643,661 B2 | 11/2003 | Polizzi et al. | |
| 6,658,623 B1 | 12/2003 | Schilit et al. | |
| 6,665,659 B1* | 12/2003 | Logan | |
| 6,678,694 B1 | 1/2004 | Zimmermann et al. | |
| 6,691,106 B1 | 2/2004 | Sathyanarayan | |
| 6,745,193 B1 | 6/2004 | Horvitz et al. | |
| 6,804,675 B1 | 10/2004 | Knight et al. | |
| 6,853,982 B2 | 2/2005 | Smith et al. | |
| 6,871,140 B1 | 3/2005 | Florance et al. | |
| 6,873,990 B2 | 3/2005 | Oblinger | |
| 6,912,505 B2 | 6/2005 | Linden et al. | |
| 6,941,321 B2 | 9/2005 | Schuetze et al. | |
| 6,981,040 B1 | 12/2005 | Konig et al. | |
| 7,162,473 B2 | 1/2007 | Dumais et al. | |
| 7,464,086 B2 | 12/2008 | Black et al. | |
| 7,765,178 B1 | 7/2010 | Roizen et al. | |
| 2002/0024532 A1 | 2/2002 | Fables et al. | |
| 2002/0095621 A1 | 7/2002 | Lawton | |
| 2002/0184095 A1 | 12/2002 | Scullard et al. | |
| 2002/0198882 A1 | 12/2002 | Linden et al. | |
| 2003/0014399 A1 | 1/2003 | Hansen et al. | |
| 2003/0126136 A1 | 7/2003 | Omoigui | |
| 2003/0195877 A1 | 10/2003 | Ford et al. | |
| 2003/0233345 A1 | 12/2003 | Perisic et al. | |
| 2004/0044571 A1 | 3/2004 | Bronnimann et al. | |
| 2004/0088286 A1 | 5/2004 | Hackleman et al. | |
| 2004/0186827 A1 | 9/2004 | Anick et al. | |
| 2004/0205516 A1 | 10/2004 | Tufts | |
| 2004/0210661 A1 | 10/2004 | Thompson | |
| 2004/0215608 A1 | 10/2004 | Gourlay | |
| 2004/0236736 A1 | 11/2004 | Whitman et al. | |
| 2004/0249808 A1 | 12/2004 | Azzam et al. | |
| 2004/0260621 A1 | 12/2004 | Foster et al. | |
| 2005/0027742 A1 | 2/2005 | Eichstaedt et al. | |
| 2005/0033657 A1 | 2/2005 | Herrington et al. | |
| 2005/0033803 A1* | 2/2005 | Vleet | G06F 17/30867 709/203 |
| 2005/0055281 A1* | 3/2005 | Williams | 705/26 |
| 2005/0060311 A1 | 3/2005 | Tong et al. | |
| 2005/0071328 A1* | 3/2005 | Lawrence | 707/3 |
| 2005/0080786 A1 | 4/2005 | Fish et al. | |
| 2005/0120003 A1 | 6/2005 | Drury et al. | |
| 2005/0144067 A1 | 6/2005 | Farahat et al. | |
| 2005/0222987 A1* | 10/2005 | Vadon | 707/3 |
| 2005/0222989 A1* | 10/2005 | Haveliwala | G06Q 30/02 |
| 2005/0240580 A1* | 10/2005 | Zamir et al. | 707/4 |
| 2005/0278633 A1 | 12/2005 | Kemp | |
| 2006/0026147 A1 | 2/2006 | Cone et al. | |
| 2006/0212265 A1 | 9/2006 | Amitay et al. | |
| 2006/0230035 A1 | 10/2006 | Bailey et al. | |
| 2006/0248078 A1 | 11/2006 | Gross et al. | |
| 2006/0259861 A1 | 11/2006 | Watson | |
| 2007/0043706 A1 | 2/2007 | Burke et al. | |
| 2007/0050339 A1 | 3/2007 | Kasperski et al. | |
| 2007/0100798 A1 | 5/2007 | Kapur | |
| 2007/0100836 A1 | 5/2007 | Eichstaedt et al. | |
| 2007/0214115 A1 | 9/2007 | Liu et al. | |
| 2007/0239680 A1 | 10/2007 | Oztekin et al. | |
| 2007/0266025 A1 | 11/2007 | Wagner et al. | |

OTHER PUBLICATIONS

Balabanovic, M. "An Adaptive Web Page Recommendation Service," 1st Int'l Conf. on Autonomous Agents, Marina del Ray, CA., Feb. 1997.

Bomhardt, C., "NewsRec, a SVM-Driven Personal Recommendation System for News Websites," IEEE/WIC/ACM Int'l Conf. on Web Intelligence, 2004.

Callan, J., et al., "Personalisation and Recommender Systems in Digital Libraries" Joint NSF-EU DELOS Working Group Report, DELOSNSF Workshop on Personalization and Recommender Systems in Digital Libraries, May 2003.

Chirita et al., "Pros: A Personalized Ranking Platform for Web Search," Adaptive Hypermedia and Adaptive Web-Based Systems, Third International Conference, AH 2004, Eindohven, The Netherlands, Aug. 23-26, 2004, Publication Date Nov. 2004, Proceedings, 10 pages.

Cosley, D., et al., "REFEREE: An Open Framework for Practical Testing in Recommender Systems Using ResearchIndex," Proceedings of the 28th VLDB Conference, Hong Kong, China, 2002.

Dube, J., "Google's New News Alerts," Poynteronline, www.poynter.orglcontentlcontent_print.asp"id=43832&custom . . . , Aug. 7, 2003.

Furner, J., "On Recommending," J. American Society for Information Science and Technology, vol. 53, No. 9, Jan. 2002.

Henzinger, M., "Google Tutorial: Web Information Retrieval," Google, Inc., Data Engineering 2000, 16th International Conference on Proceedings, Aug. 6, 2002, 16 pages.

Heylighen, F., "Collective Intelligence and its Implementation on the Web: Algorithms to Develop a Collective Mental Map," Computational & Mathematical Organization Theory. vol. 5, No. 3, 1999.

Ioannidis, Y., et al., "Personalization: Models and Methods," http://thalis.cs.unipi.gr/~isl/db/courses/db3/slides/personal.pdf, 2004.

Jeh, G., et al., "Scaling Personalized Web Search," Proceedings of the 12m Int'l World Wide Web Conf., 2003.

Koutrika, G., et al., "Personalization of Queries in Database Systems," Proceedings of the 20th International Conference on Data Engineering, 2004.

Kushmerick, N., et al., "Toward Zero-Input Personalization: Referrer-Based Page Recommendation," P. Brusilovsky, O. Stock, C. Strapparava (Eds.): Adaptive Hypermedia and Adaptive Web-Based Systems International Conference, AH 2000, Trento, Italy, Aug. 2000.

Liu, F., et al., "Personalized Web Search by Mapping User Queries to Categories," Proceedings of CIKM '02, McLean, V A, Nov. 4-9, 2002.

Liu, F., et al., "Personalized Web Search by Improving Retrieval Effectiveness," IEEE Transactions on Knowledge and Data Engineering, vol. 16, No. 1, Jan. 2004.

McNee, S. M., et al., "On the Recommending of Citations for Research Papers," Proceedings of CSCW '02, New Orleans, LA, Nov. 16-20, 2002.

Mobasher, B., et al., "Discovery of Aggregate Usage Profiles for Web Personalization," Proceedings of the Web Mining for E-Commerce Workshop (WEBKDD'2000), Sixth ACM SIGKDD International Conference on Knowledge Discovery and Data Mining, Boston, MA, Aug. 2000.

Mobasher, B., et al., "Discovery and Evaluation of Aggregate Usage Profiles for Web Personalization," Data Mining and Knowledge Discovery, 6:61-82, 2002.

Pemberton, D., et al., "GroupMark: A WWW Recommender System Combining Collaborative and Information Filtering," ERCIM Workshop on "User Interfaces for All", Florence, Italy, Oct. 2S-26, 2000.

Pitkow, J., et al., "Personalized Search: A Content Computer Approach May Prove a Breakthrough in Personalized Search Efficiency," Communications of the ACM, vol. 4S, No. 9, Sep. 2002.

Ranganathan, S., "Text Classification Combining Clustering and Hierarchical Approaches," Masters thesis, Dept. of Electrical Engineering and Computer Science, University of Kansas, defense date May 3, 2004.

Resnick, P., et al., "GroupLens: An Open Architecture for Collaborative Filtering of Netnews," Proceedings of ACM 1994 Conf. on Computer Support Cooperative Work.

(56) References Cited

OTHER PUBLICATIONS

Sugiyama, K., et al., "Adaptive Web Search Based on User Profile Constructed Without Any Effort from Users," Proceedings of the WWW 2004, New York, NY, May 17-22, 2004.
Sun, J.T., et al., "CubeSVD: A Novel Approach to Personalized Web Search," WWW 2005, Chiba, Japan, May 10-14, 2005.
Teevan, J., et al., "Personalizing Search via Automated Analysis of Interests and Activities," Proceedings of the 28th annual international ACM SIGIR Conference on research and development in information retrieval, Salvador, Brazil, Aug. 15-19, 2005, 8 pages.
Terveen, L., et al., "Constructing, Organizing, and Visualizing Collections of Topically Related Web Resources," ACM Transaction on Computer-Human Interaction, 1999.
Verberne, A., et al., "Building a Recommendation Engine for a Personalized Webpad Browser," International Lisp Conference, Oct. 27-31, 2002.
Woodruff, A., et al., "Enhancing a Digital Book with a Reading Recommender," In Proc. ACM CHI 2000, 2000.
Xu, G., et al., "A Web Recommendation Technique Based on Probabilistic Latent Semantic Analysis," Proceedings of WISE 2005, New York, NY, Nov. 20-22, 2005, 14 pages.
"Web Searching," Christopher C. Yang, Ed., Slides 1 and 39 of Course Slides from ECT 7010 Fundamentals of E-Commerce Technologies, The Chinese University of Hong Kong, http://www.aect.cuhk.edu.hk/~ect7010, last updated Nov. 25, 2005.
Google, "Google Alerts (BETA) Frequently Asked Questions," Nov. 22, 2005, 3 pages.
Google, "Google Desktop Download," Nov. 7, 2005, 7 pages.
Google, Google Personalized Search Help (Beta), Nov. 7, 2005, 4 pages.
Google, "Google Toolbar Help," Nov. 7, 2005, 3 pages.
Gahran, "Contentious—More Furl Tricks," http://blog.contentious.com/archives/2004/07/01/more-furl-tricks, Jul. 1, 2004, 3 pages.
Science Direct, "Saving a Search Alert," Nov. 22, 2005, 1 page.
"Using A9.com," Frequently Asked Questions, Dec. 15, 2005, 1-12.
Alexa Internet, Technology Web Page, http://pages.alexa.com/company/technology.html, Oct. 22, 2004, 3 pages.
Smart Box and Alerting, "Your Alert Profile," Reviews.com, Nov. 22, 2005, 3 pages.
"Copernic Agent: An integrated information retrieval tool," Editorial, www.botspot.com/intelligent_agent/4.html, Oct. 16, 2002.
"LookSmart's Furl—FAQ," Nov. 8, 2005, 16 pages.
"LookSmart's Furl—Learn More," Nov. 8, 2005, 2 pages.
PassingNotes.com, "Say farewell to Blogs and Bookmarks and get your Furl on," retrieved Nov. 6, 2005.
Collaborative Filtering Engine, "News COFE 4.0 Announcement," http://eecs.oregonstate.edu/iis/CoFE, Dec. 17, 2004.
"Welcome to TracerLock," http://www.tracerlock.com, Nov. 8, 2008.
Quick Guides—Alerting in Justis.com, Nov. 22, 2005, 3 pages.
Brin, S., et al., "The Anatomy of a Large-Scale Hypertextual Web Search Engine," 7th Int'l World Wide Web Conf., Brisbane, Australia, Apr. 1998.
International Search Report for International Application No. PCT/US2006/062731, mailed Jun. 4, 2007.
Chen, L., et al., "WebMate: A Personal Agent for Browsing and Searching," Proceedings of the 2ND International Conference on Autonomous Agents Minneapolis/St. Paul, MN, May 9-13, 1998, Proceedings of the International Conference on Autonomous Agents, New York, NY:ACM, US, May 9, 1998, 132-139.
Markatos, E., et al., "Effective Resource Discovery on the World Wide Web," WebNet 98—World Conference of the WWW, Internet, and Intranet, Orlando, Florida, Nov. 7-12, 1998, 1-6, Retrieved from the Internet: http://citeseer.ist.psu.edu166509.html.
Papathanasiou, A., et al., "USEwebNET: A Tool for Effective Resource Discovery on the World Wide Web—User's Manual,"
Internet, Jul. 1999, pp. 1-23, Retrieved from the Internet: http://www.cs.rochester.edu/{papathan/research/USEwebNET/distribution/SUBMIT_DIR-Julky1999/Documents/Guides/USEwebNET_guide.doc.
Somlo, G., et al., "QueryTracker: An Agent for Tracking Persistent Information Needs," Autonomous Agents and Multiagent Systems, 2004, AAMAS 2004. Proceeding of the Third International Joint Conference on New York, NY, USA, Jul. 19-23, 2004, Piscataway, NJ, USA, IEEE, Jul. 19, 2004, 488-495.
Copernic Technologies Inc: "Copernic 2000 Pro Product Overview," Internet Citation, Jan. 6, 2000, Retrieved from the Internet: http://web.archive.org/web/20000304163502/www.copernic.com/pro/index.htm.
Beeferman, D., et al., "Agglomerative Clustering of a Search Engine Query Log," ACM SIGKDD Int'l Conf. on Knowledge Discovery and Data Mining (KDD), 2000, pp. 407-416.
Billerbeck, B., et al., "Query Expansion Using Associated Queries," Proceedings of Int'l Conf. on Information Knowledge Management, New Orleans, Louisiana, Nov. 2003, 1-11.
Davison, B.D., et al., "Finding Relevant Website Queries," WWW2003, Budapest, Hungry, May 20-24, 2003, 2 pages.
Fitzpatrick, L., et al., "Automatic Feedback Using Past Queries: Social Searching?" Proceedings of the 20th Annual Int'l ACM SIGIR Conf. on Research and Development in Information Retrieval, ACM Press, New York, New York, 1997, 306-312.
Glance, N. S., "Community Search Assistant," Artificial Intelligence for Web Search, AAAI Press, Jul. 2000, 6 pages, also presented at the AAAI-2000 Workshop on Artificial Intelligence for Web Search, Technical Report WD-00-01.
Haveliwala, T.H., "Topic Sensitive PageRank," PowerPoint Presentation, 2002, pp. 1-15.
Haveliwala, T.H., "Topic-Sensitive PageRank," WWW2002, Honolulu, Hawaii, May 7-11, 2002, 10 pages.
Walkerdine, J., et al., "Sharing Searches: Developing Open Support for Collaborative Searching," Proceedings of Interact 2001, Japan, Jul. 9-13, 2001, 8 pages.
Wen, J.R., et al., "Query Clustering Using User Logs," ACM Transactions on Information Systems, vol. 20, No. 1, Jan. 2002, 59-81.
Zaiane, O.R., et al., "Finding Similar Queries to Satisfy Searches Based on Query Traces," Proceedings of the Int'l Workshop on Efficient Web-Based Information Systems (EWIS), Montpellier, France, Sep. 2002, 11 pages.
Office Action for U.S. Appl. No. 11/323,096 dated Jan. 9, 2008, 20 pages.
Office Action for U.S. Appl. No. 11/323,096 dated Jul. 10, 2008, 18 pages.
Office Action for U.S. Appl. No. 11/323,096 dated Jan. 22, 2009, 23 pages.
Office Action for U.S. Appl. No. 11/323,096 dated Jul. 2, 2009, 29 pages.
Office Action for U.S. Appl. No. 11/323,096 dated Apr. 29, 2010, 29 pages.
Office Action for U.S. Appl. No. 11/232,096 dated Jun. 3, 2010, 29 pages.
Notice of Allowance for U.S. Appl. No. 11/323,096 dated Oct. 1, 2010, 8 pages.
Notice of Allowance for U.S. Appl. No. 11/323,096 dated Dec. 8, 2010, 4 pages.
Office Action issued in U.S. Appl. No. 13/043,400 on Oct. 31, 2011, 27 pages.
Office Action issued in U.S. Appl. No. 13/043,400 on Jul. 31, 2012, 30 pages.
Office Action issued in U.S. Appl. No. 13/043,400 on Jun. 24, 2013, 18 pages.
Notice of Allowance issued in U.S. Appl. No. 13/043,400 on Nov. 22, 2013, 9 pages.

\* cited by examiner

| User Identifier 402 | Event-Based Data 404 | | | Derived Data 406 | Additional Data 408 |
|---|---|---|---|---|---|
| | Query Event 410 | Result Click Event 412 | Browsing Event 416 | ... | ... |
| | EventID | EventID | EventID | | |
| | Timestamp | Timestamp | Timestamp | Information | Information |
| | Other | Other | Other | | |
| | Query | Query | Information | ... | ... |
| | History Score | History Score | History Score | Content ID 434 / Score 432 | Query ID 438 / Results 440 |
| | ContentIDs 425 | ContentID 418 | ContentID 420 | 426 | |

User Record 400 in User Information Database 116

US 9,323,846 B2

METHOD, SYSTEM, AND GRAPHICAL USER INTERFACE FOR ALERTING A COMPUTER USER TO NEW RESULTS FOR A PRIOR SEARCH

RELATED APPLICATIONS

This application is a continuation of U.S. application Ser. No. 13/043,400 filed Mar. 8, 2011, which is a continuation of U.S. application Ser. No. 11/323,096, filed Dec. 30, 2005, the contents of which are incorporated by reference.

TECHNICAL FIELD

The disclosed embodiments relate generally to search engines. More particularly, the disclosed embodiments relate to methods, systems, and user interfaces for alerting a computer user to new results for a prior search.

BACKGROUND

Search engines typically provide a source of indexed documents from the Internet (or an intranet) that can be rapidly scanned in response to a search query submitted by a user. As the number of documents accessible via the Internet grows, the number of documents that match a particular query may also increase. However, not every document matching the query is likely to be equally important from a user's perspective. A user may be overwhelmed by an enormous number of documents returned by a search engine, unless the documents are ordered based on their relevance to the user's query. One way to order documents is the PageRank algorithm more fully described in the article "The Anatomy of a Large-Scale Hypertextual Search Engine" by S. Brin and L. Page. $7^{th}$ International World Wide Web Conference, Brisbane, Australia and U.S. Pat. No. 6,285,999, both of which are hereby incorporated by reference as background information.

Some queries by a computer user may concern continuing interests of the user. Some search engines, such as Google's Web Alerts, allow the user to explicitly specify such queries and receive alerts when a new web page in the top-ten search results appears for the query. However, it is too inconvenient for most users to explicitly register such queries. Google is a trademark of Google Inc. For example, in an internal study of 18 Google Search History users, out of 154 past queries that the users expressed a medium to strong interest in seeing further results, none of these queries was actually registered as a web alert. In addition, alerting the user to all changes to the search results for the query may cause too many uninteresting results to be shown to the user, due to minor changes in the web or spurious changes in the ranking algorithm.

Thus, it would be highly desirable to find ways to automatically identify queries in a user's search history that concern continuing interests of the user. In addition, it would be highly desirable to find ways to automatically identify user-relevant results to prior searches by the user that have not been shown to the user and to alert the user to such results.

SUMMARY

The present invention overcomes the problems described above.

One aspect of the invention involves a computer-implemented method in which a search engine accesses Internet usage data for a computer user, wherein the usage data include a plurality of search queries by the user, using at least some of the Internet usage data, identifies search queries in the plurality of search queries that meet predefined query selection criteria for queries that correspond to continuing interests of the user; reruns at least some of the identified search queries; evaluates search results from the rerun queries to select search results that meet predefined search result selection criteria; and sends links corresponding to at least some of the selected search results to a computer associated with the user for display.

Another aspect of the invention involves a computer-implemented method in which a search engine accesses Internet usage data for a computer user, wherein the usage data include a plurality of search queries by the user, using at least some of the Internet usage data, identifies search queries in the plurality of search queries that meet predefined query selection criteria for queries that correspond to continuing interests of the user; and reruns at least some of the identified search queries.

Another aspect of the invention involves a computer-implemented method in which a search engine produces search results by rerunning a plurality of search queries that have been performed previously for a computer user; evaluates the produced search results to select search results that meet predefined search result selection criteria, wherein at least one of the criteria is based on Internet usage data for the user; and sends links corresponding to at least some of the selected search results to a computer associated with the user for display.

Another aspect of the invention involves a graphical user interface on a computer that includes a plurality of links recommended by a search engine for a computer user. The plurality of links are determined by the search engine by: producing search results by rerunning a plurality of search queries that have been performed previously for the computer user; and evaluating the produced search results to select search results that meet predefined search result selection criteria, wherein at least one of the criteria is based on Internet usage data for the user.

Another aspect of the invention involves a computer-implemented method in which a client computer sends Internet usage data for a computer user to a server computer, wherein the usage data include a plurality of search queries by the user. The server computer, using at least some of the Internet usage data, identifies search queries in the plurality of search queries that meet predefined query selection criteria for queries that correspond to continuing interests of the user; reruns at least some of the identified search queries; and evaluates search results from the rerun queries to select search results that meet predefined search result selection criteria. The client computer receives links corresponding to at least some of the selected search results from the server computer and displays at least some of the received links.

Another aspect of the invention involves a system that includes at least one server. The at least one server is configured to access Internet usage data for a computer user, wherein the usage data include a plurality of search queries by the user, using at least some of the Internet usage data, identify search queries in the plurality of search queries that meet predefined query selection criteria for queries that correspond to continuing interests of the user; and rerun at least some of the identified search queries.

Another aspect of the invention involves a client computer that is configured to send Internet usage data for a computer user to a server computer, wherein the usage data include a plurality of search queries by the user. The server computer, using at least some of the Internet usage data, identifies search queries in the plurality of search queries that meet predefined query selection criteria for queries that correspond to continuing interests of the user; reruns at least some of the identified search queries; and evaluates search results from the rerun queries to select search results that meet predefined search result selection criteria. The client computer is configured to receive links corresponding to at least some of the selected search results from the server computer and display at least some of the received links.

Another aspect of the invention involves a computer-program product that includes a computer readable storage medium and a computer program mechanism embedded therein. The computer program mechanism includes instructions, which when executed by a server computer, cause the server computer to access Internet usage data for a computer user, wherein the usage data include a plurality of search queries by the user; using at least some of the Internet usage data, identify search queries in the plurality of search queries that meet predefined query selection criteria for queries that correspond to continuing interests of the user; and rerun at least some of the identified search queries.

Another aspect of the invention involves a computer-program product that includes a computer readable storage medium and a computer program mechanism embedded therein. The computer program mechanism includes instructions, which when executed by a client computer, cause the client computer to send Internet usage data for a computer user to a server computer, wherein the usage data include a plurality of search queries by the user. The server computer, using at least some of the Internet usage data, identifies search queries in the plurality of search queries that meet predefined query selection criteria for queries that correspond to continuing interests of the user; reruns at least some of the identified search queries; and evaluates search results from the rerun queries to select search results that meet predefined search result selection criteria. The computer program mechanism also includes instructions, which when executed by the client computer, cause the client computer to receive links corresponding to at least some of the selected search results from the server computer and display at least some of the received links.

Another aspect of the invention involves a server computer with means for accessing Internet usage data for a computer user, wherein the usage data include a plurality of search queries by the user, using at least some of the Internet usage data, means for identifying search queries in the plurality of search queries that meet predefined query selection criteria for queries that correspond to continuing interests of the user; and means for rerunning at least some of the identified search queries.

Another aspect of the invention involves a client computer with means for sending Internet usage data for a computer user to a server computer, wherein the usage data include a plurality of search queries by the user. The server computer, using at least some of the Internet usage data, identifies search queries in the plurality of search queries that meet predefined query selection criteria for queries that correspond to continuing interests of the user; reruns at least some of the identified search queries; and evaluates search results from the rerun queries to select search results that meet predefined search result selection criteria. The client computer also has means for receiving links corresponding to at least some of the selected search results from the server computer and means for displaying at least some of the received links.

Another aspect of the invention involves a system that includes at least one server. The at least one server is configured to produce search results by rerunning a plurality of search queries that have been performed previously for a computer user; evaluate the produced search results to select search results that meet predefined search result selection criteria, wherein at least one of the criteria is based on Internet usage data for the user; and send links corresponding to at least some of the selected search results to a computer associated with the user for display.

Another aspect of the invention involves a computer-program product that includes a computer readable storage medium and a computer program mechanism embedded therein. The computer program mechanism includes instructions, which when executed by a server computer, cause the server computer to produce search results by rerunning a plurality of search queries that have been performed previously for a computer user; evaluate the produced search results to select search results that meet predefined search result selection criteria, wherein at least one of the criteria is based on Internet usage data for the user, and send links corresponding to at least some of the selected search results to a computer associated with the user for display.

Another aspect of the invention involves a server computer with means for producing search results by rerunning a plurality of search queries that have been performed previously for a computer user, means for evaluating the produced search results to select search results that meet predefined search result selection criteria, wherein at least one of the criteria is based on Internet usage data for the user; and means for sending links corresponding to at least some of the selected search results to a computer associated with the user for display.

Thus, the present invention provides improved methods, systems and user interfaces for alerting a computer user to new results for a prior search.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 4 is an exemplary user record in the user information database in accordance with one embodiment of the invention.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Figure 1:
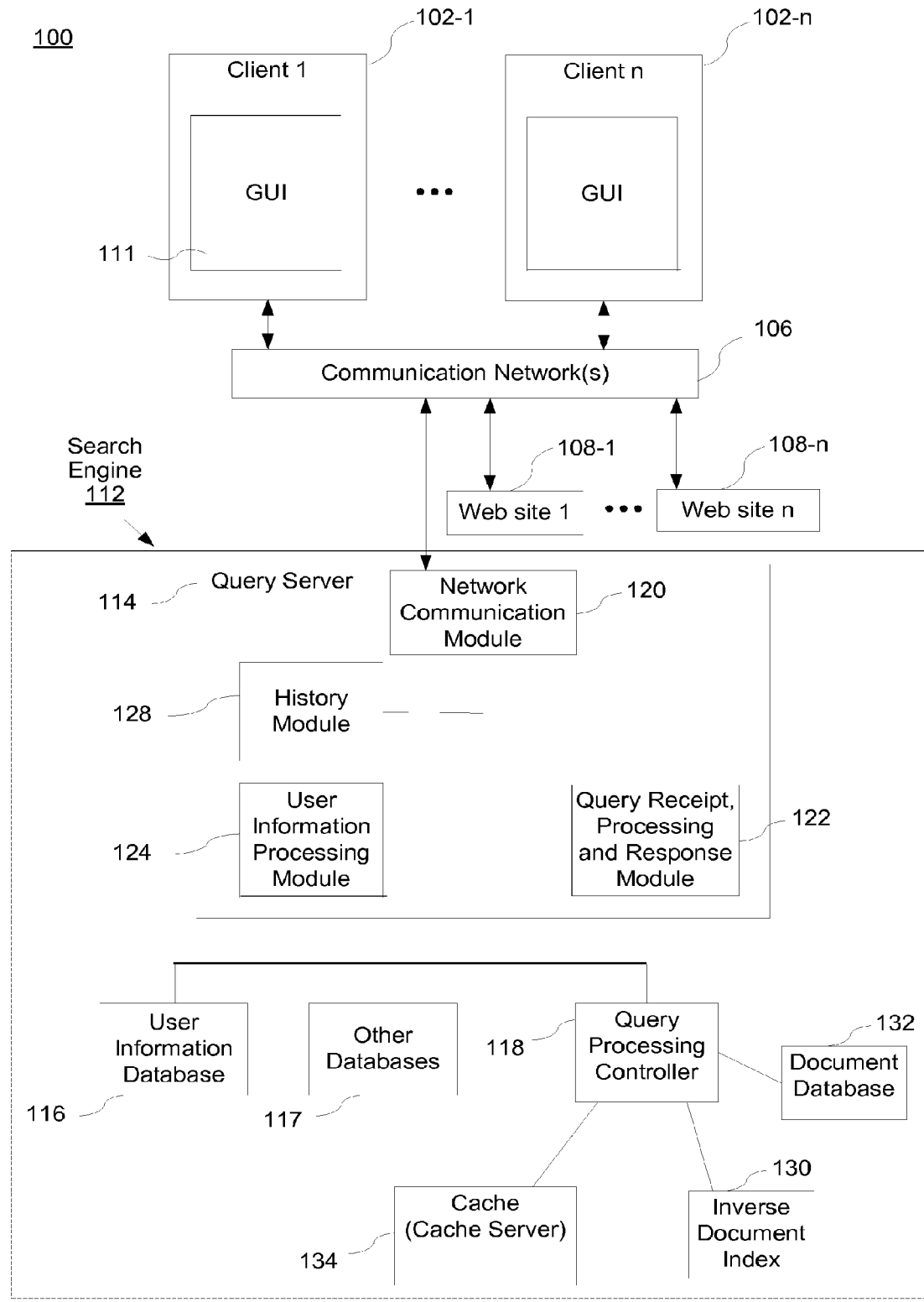
FIG. 1 is a block diagram illustrating an exemplary distributed computer system in accordance with one embodiment of the invention.

FIG. 1 is a block diagram illustrating an exemplary distributed computer system 100 according to one embodiment of the invention. FIG. 1 shows various functional components that will be referred to in the detailed discussion that follows. The system 100 may include one or more client computers 102. Client computers 102 can be any of a number of computing devices (e.g., Internet kiosk, personal digital assistant, cell phone, gaming device, desktop computer, laptop computer, handheld computer, or combinations thereof) used to enable the activities described below. Client 102 includes graphical user interface (GUI) 111. Clients 102 are connected to a communications network 106. The communications network 106 connects the clients 102 to a search engine system 112. Search engine 112 includes a query server 114 connected to the communications network 106, a user information database 116, a query processing controller 118, and optionally other databases 117.

Search engine 112 generates search results in response to search queries from one or more clients 102 and also provides alerts to new results for some prior searches. It should be appreciated that the layout of the search engine system 112 is merely exemplary and may take on any other suitable layout or configuration. The search engine system 112 is used to search an index of documents, such as billions of web pages or other documents indexed by modern search engines.

Note that the search engine system 112 can be used as an Internet search engine, for locating documents on the WWW and/or as an intranet search engine, for locating documents stored on servers or other hosts within an intranet. In addition, the methodology described herein is applicable to implementations where only portions of documents, such as titles and abstracts, are stored in a database (e.g., 132) of the search engine system 112.

The search engine system 112 may include multiple data centers, each housing a backend. The data centers are generally widely dispersed from one another, such as across the continental United States. Search queries submitted by users at one of the clients 102 to the search engine system 112 are routed to an appropriate backend as part of the Domain Name System (DNS), based on current load, geographic locality and/or whether that data center is operating.

Each backend preferably includes multiple query servers, such as query server 114, coupled to a communications network 106 via a network communication module 120. The communications network 106 may be the Internet, but may also be any local area network (LAN) and/or wide area network (WAN). In some embodiments, each query server 114 is a Web server that receives search query requests and delivers search results and alerts to new results for some prior searches in the form of web pages or feeds via HTTP, XML, RSS or similar protocols. Alternatively, if the query server 114 is used within an intranet, it may be an intranet server. In essence, the query servers, such as query server 114, are configured to control the search and alert processes, including searching a document index, analyzing and formatting the search results.

The query server 114 typically includes a network communications module 120, a query receipt, processing and response module 122, a user information processing module 124, and a history module 128, all interconnected. The network communications module 120 connects the query server 114 to the communication network 106 and enables the receipt of communications from the communication network 106 and the provision of communications to the communication network 106 bound for the client 102 or other destinations. The query receipt, processing and response module 122 is primarily responsible for receiving search queries, processing them and returning responses and alerts to the client 102 via the network communications module 120. In some embodiments, the history module 128 maintains a record of queries submitted by users. In some embodiments, the history module maintains a record of search results sent to the users, independent of whether the users selected the results for viewing or downloading. In some embodiments, the history module also maintains a record of search results selected by the users for viewing or downloading, sometimes called click through information. The click through information may include statistical information, including the number of times that each search result was clicked through and/or the number of times each search result was viewed by users for more than a threshold period of time (i.e., the number of times the users clicked through each search result without navigating away from the resulting page or document in less than the threshold period of time).

The user information processing module 124 assists in accessing, updating and modifying the user information database 116. The user information database 116 stores various information about the user's activities in a user record (described below). In addition, the user information database 116 may store derived information about the user based on the user's activities. In some embodiments, the user information database 116 stores user profiles, a portion of which are the derived information. The other databases 117 optionally include other databases with which the various modules in query server 114 may interact, such as a message database (electronic or otherwise), and user-created document databases (e.g., documents created from word processing programs, spreadsheet programs, or other various applications).

The query processing controller 118 is connected to an inverse document index 130, a document database 132 and a query cache 134. The cache 134 is used to temporarily store search queries and search results, and is used to serve search results for queries submitted multiple times (e.g., by multiple users). The inverse document index 130 and document database 132 are sometimes collectively called the document database. In some embodiments, "searching the document database" means searching the inverse document index 130 to identify documents matching a specified search query or term.

Search rank values for the documents in the search results are conveyed to the query processing controller 118 and/or the query server 114, and are used to construct various lists, such as a list of ordered search results, a personalized list of recommended web pages, or a list of new results for one or more prior searches by a user. Once the query processing controller 118 constructs the list, the query processing controller 118 may transmit to the document database 132 a request for snippets of an appropriate subset of the documents in the list. For example, the query processing controller 118 may request snippets for the first fifteen or so of the documents in the list. In some embodiments, the document database 132 constructs snippets based on the search query, and returns the snippets to the query processing controller 118. The query processing controller 118 then returns a list of located documents with their associated links (i.e., hyperlinks) and snippets back to the query server 114. In some embodiments, the snippets are stored in the cache server 134 along with the search results. As a result, in these embodiments the query processing controller 118 may only request snippets for documents, if any, for which it is unable to obtain valid cached snippets from the cache server 134.

In some embodiments, fewer and/or additional modules, functions or databases are included in the search engine 112. The modules shown in FIG. 1 as being part of search engine 112 represent functions performed in an exemplary embodiment.

Although FIG. 1 portrays discrete blocks, the figure is intended more as a functional description of some embodiments of the invention rather than a structural description of the functional elements. One of ordinary skill in the art will recognize that an actual implementation might have the functional elements grouped or split among various components. For example, the user information database 116 may be part of the query server 114. In some embodiments the user information database 116 may be implemented using one or more servers whose primary function is to store and process user information. Similarly, the document database 132 may be implemented on one or more servers whose primary purpose is to store various documents. Moreover, one or more of the blocks in FIG. 1 may be implemented on one or more servers designed to provide the described functionality. Although the description herein refers to certain features implemented in the client 102 and certain features implemented in the search system 112, the embodiments of the invention are not limited to such distinctions. For example, features described herein as being part of the search system 112 could be implemented in whole or in part in the client 102, and vice versa.

Figure 2:
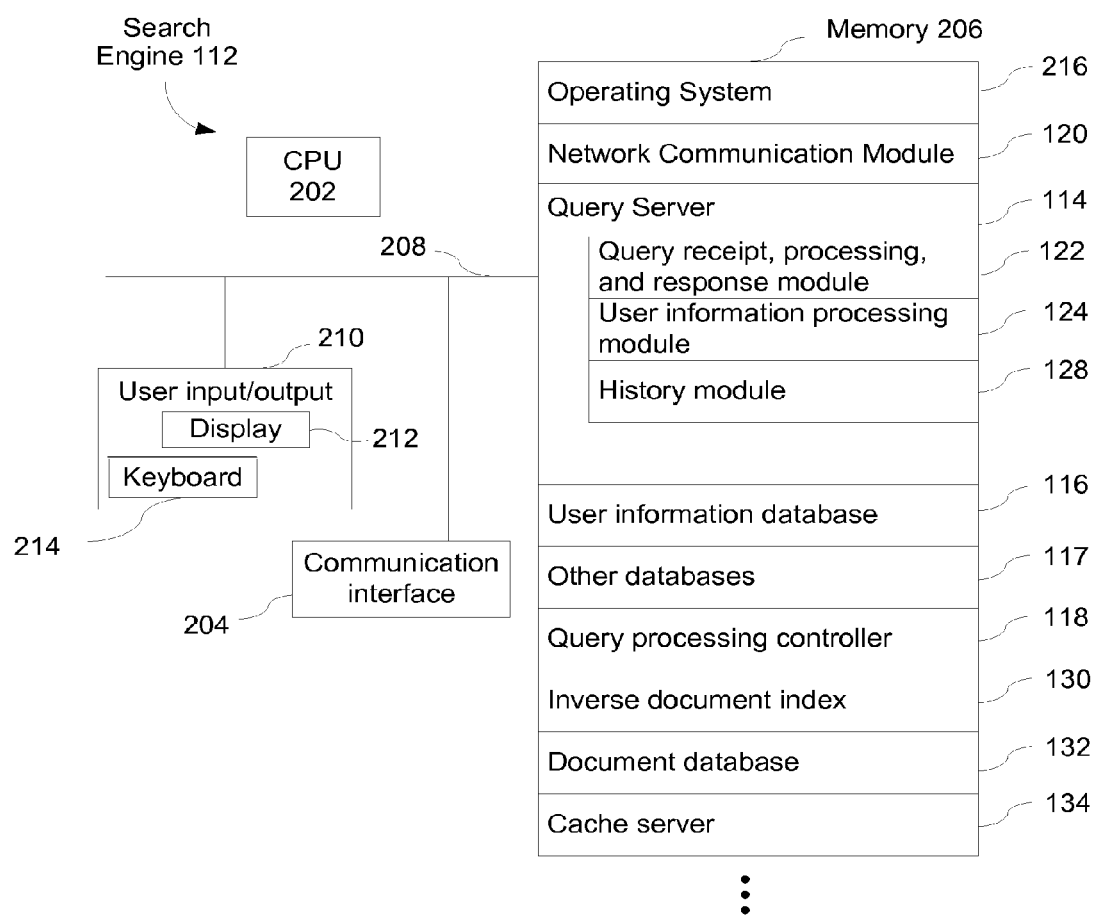
FIG. 2 is a block diagram illustrating a search engine in accordance with one embodiment of the invention.

FIG. 2 is a block diagram illustrating search engine 112 in accordance with one embodiment of the present invention. Search engine 112 typically includes one or more processing units (CPU's) 202, one or more network or other communications interfaces 204, memory 206, and one or more communication buses 208 for interconnecting these components. The communication buses 208 may include circuitry (sometimes called a chipset) that interconnects and controls communications between system components. Search engine 112 optionally may include a user interface 210 comprising a display device 212 and a keyboard 214. Memory 206 may include high speed random access memory and may also include non-volatile memory, such as one or more magnetic or optical disk storage devices. Memory 206 may optionally include one or more storage devices remotely located from the CPU(s) 202. In some embodiments, the memory 206 stores the following programs, modules and data structures, or a subset or superset thereof:

an operating system 216 that includes procedures for handling various basic system services and for performing hardware dependent tasks;

a network communication module (or instructions) 120 that is used for connecting search engine 112 to other computers (e.g., clients 102 and web sites 108) via one or more communication network interfaces 204 (wired or wireless) and one or more communication networks, such as the Internet, other wide area networks, local area networks, metropolitan area networks, and so on;

a query server 114 for responding to and processing communications from the client 102 and for alerting a computer user to new results for one or more prior searches;

a user information database 116 for storing information about users as described in reference to FIG. 4;

other databases 117 that the various modules in query server 114 may interact with, such as a message database (electronic or otherwise), and user-created document databases (e.g., documents created from word processing programs, spreadsheet programs, or other various applications);

a query processing controller 118 for receiving requests from one of the query servers, such as the query server 114, and transmitting the requests to the cache 134, the inverse document index 130 and the document database 132;

an inverse document index 130 for storing a set of words contained in document database 132 and, for each word, pointers to documents in document database 132 that contain the word;

a document database 132 for storing documents or portions of documents such as web pages; and a cache server 134 for increasing search efficiency by temporarily storing previously submitted search queries and corresponding search results.

In some embodiments, the query server 114 includes the following elements, or a subset of such elements: a query receipt, processing and response module 122 for receiving and responding to search queries, for providing alerts to new results for one or more prior searches, and for managing the processing of search queries by one or more query processing controllers, such as query processing controller 118, that are coupled to the query server 114; a user information and processing module 124 for accessing and modifying the user information database 116, which includes one or more user records 400 (described in more detail in FIG. 4 below); and a history module 128 for processing and handling requests for searching a user's online history (e.g., the user's prior queries, sent URLs, query result click throughs and visited URLs). In some embodiments, the query server 114 and/or the user information database 116 include additional modules.

Figure 3:
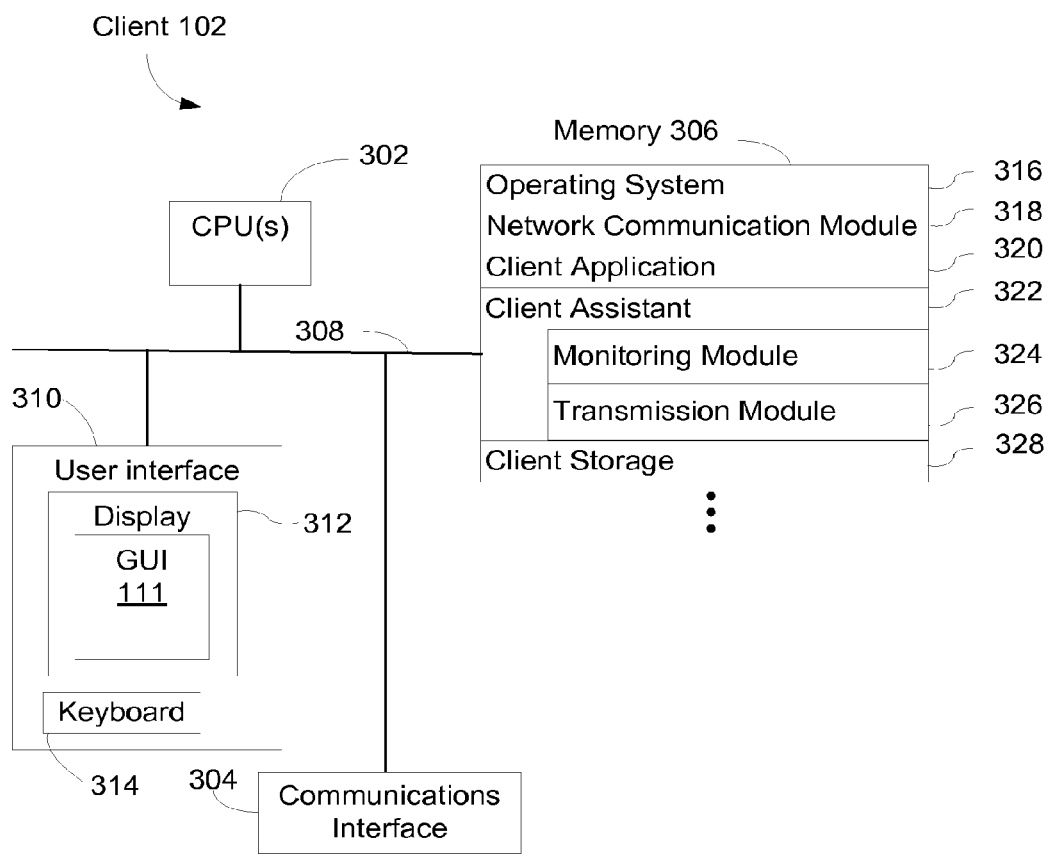
FIG. 3 is a block diagram illustrating a client in accordance with one embodiment of the invention.

FIG. 3 is a block diagram illustrating client 102 in accordance with one embodiment of the invention. Client 102 typically includes one or more processing units (CPUs) 302, one or more network or other communications interfaces 304, memory 306, and one or more communication buses 308 for interconnecting these components. The communication buses 308 may include circuitry (sometimes called a chipset) that interconnects and controls communications between system components. The client system 102 may include a user interface 310, for instance a display 312 with GUI 111 and a keyboard 314. Memory 306 may include high speed random access memory and may also include non-volatile memory, such as one or more magnetic or optical storage disks. Memory 306 may include mass storage that is remotely located from CPUs 302. Memory 306 may store the following elements, or a subset or superset of such elements:

an operating system 316 that includes procedures for handling various basic system services and for performing hardware dependent tasks;

a network communication module (or instructions) 318 that is used for connecting the client system 102 to other computers via the one or more communications interfaces 304 (wired or wireless) and one or more communication networks, such as the Internet, other wide area networks, local area networks, metropolitan area networks, and so on;

a client application 320 such as a browser application;

a client assistant 322 (e.g., a toolbar, iframe (inline frame), or browser plug-in), which includes a monitoring module 324 for monitoring the activities of a user, and a transmission module 326 for transmitting information about the user's activities to and receiving information from the search system 112; and client storage 328 for storing data and documents, including web pages or feeds with search results received in response to a search query and alerts to new results for one or more prior searches.

Each of the above identified modules and applications in FIGS. 2-3 correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memories 206 and 306 may store a subset of the modules and data structures identified above. Furthermore, memories 206 and 306 may store additional modules and data structures not described above.

Although FIGS. 2-3 show search engine 112 and client 102 as a number of discrete items, FIGS. 2-3 are intended more as a functional description of the various features which may be present in search engine 112 and client 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in search engine 112 and how features are allocated among them will vary from one implementation to another, and may depend in part on the amount of data traffic that the system must handle during peak usage periods as well as during average usage periods.

FIG. 4 is an exemplary user record 400 from the user information database 116 (FIG. 1) in accordance with one embodiment of the invention. In some embodiments, user record 400 contains a subset or a superset of the elements depicted in FIG. 4. User record 400 contains a user identifier 402 that associates the information in user record 400 to a particular user or user identifier. In some embodiments, the user identifier 402 is associated with a particular instance of a client application 320. In some embodiments, the user identifier is associated with a computer user (e.g., when the user logs in with a username and password). Some of the information that can be associated with a user includes event-based data 404, derived data 406, and additional data 408. Event-based data 404 includes one or more events, each of which has a data type associated with it. In some embodiments, event-based data includes: one or more queries 410; one or more result clicks 412 (i.e., the results presented in a set of search results on which the user has clicked); and one or more browsing data 416 (e.g., URLs visited, URL visit duration data, etc.). Event-based data 404 includes one or more elements relevant to the event. For example, in some embodiments the events in the event-based data 404 includes either or both an eventID 418 and a timestamp 420. The eventID 418 is a unique identifier associated with the particular event which may be assigned by the search system in some embodiments (e.g., a 64-bit binary number). The timestamp 420 is a value (e.g., a 64-bit binary number) representing the date and/or time at which the particular event record in event-based data 404 was created or at which the particular event occurred.

In some embodiments, one or more of the query events 410, and one or more of the result clicks 412, include a query portion 421 which includes zero or more query terms associated with the recorded event. In some embodiments, the query portion indicates the query string to which the event is associated (e.g., what query produced the results that the user clicked-though). In some embodiments, the query portion 421 includes a pointer or identifier to the query event 410 associated with the result click (e.g., an eventID). In some embodiments, the query portion 421 may additionally identify a "related query". For example, the related query may be a query related to an initial query that contains a misspelling. In some instances is it more desirable to associate the event with the corrected query rather than the query containing the spelling mistake. In some embodiments, the search system 112 may generate "related queries" automatically based on the user's entered query.

In some embodiments, one or more of the queries 410, result clicks 412, and/or browsing data 416 include one or more contentIDs 422 that identify content associated with the particular event. For a query 410, the contentIDs 422 can represent the URLs or URIs (Uniform Resource Identifier) of search results that have been sent to the user. For a result click 412, the contentID 422 can represent the URL or URI that has been clicked on by the user. For browsing event 416, the contentID 422 can be the content identifier used to identify the location of the browse event (e.g., URL, data location, or other similar identifier). In some embodiments, the contentID 422 may be a document identifier that identifies a document in a document repository.

In some embodiments, the event-based data has a history score 425. An event's history score 425 may be calculated in any of a number of different ways or combinations of ways. For example, the history score 425 may be a time-based ranking value that may be periodically modified based on a length of time that has passed since the event was recorded. In some embodiments, the value of the history score decreases as the time from the recordation increases. In some embodiments, event data having a time-based ranking value below a threshold may be deleted. The values can be determined and re-determined periodically at various points in time. In some cases, removal of one or more events triggers a re-determination of one or more derived values as described above. In some embodiments, the history score 425 is determined in response to a request instead of being determined during batch or off-line processing.

In some embodiments, a browsing event 416 indicates a particular browsing event not associated with a query, but instead, with some other user activity (e.g., user selection of a link in a web page, or an email message, or a word processing document). This other user activity can be identified in an information field 426. In some embodiments, the information field 426 stores ranking values associated with the event. Such ranking values can be system generated, user created, or user modified (e.g., PageRank for URLs, or a value assigned to the event by the user). Other examples of user activity include, but are not limited to web browsing, emailing, instant messaging, word processing, participation in chat rooms, software application execution and Internet telephone calls.

In some embodiments, derived data 406 includes one or more information fields 428 containing information derived from the event-based data 404. For example, in some embodiments, the information field 428 represents a user profile which is generated from one or more of the user's query events 410, results click events 412, and browsing events 416.

For example, by examining one or more of the various events a user profile may be created indicating levels of interest in various topic categories (e.g., a weighted set of Open Directory Project ("http://dmoz.org") topics").

In some embodiments, the derived data 406 includes one or more pairs of a score 432 associated with particular contentID 434. The score 432 represents a derived score assigned to the content associated with the contentID 434 (e.g., a web page). The score 432 can be based on one or more of a number of different factors. In some embodiments, the score 432 incorporates the number of times that a user has clicked on the contentID over a period of time (which may include click throughs as a result of search queries and/or browsing activities). In some embodiments, the score 432 incorporates a time duration that the user is estimated to have been looking at the content (a stay-time). In some embodiments, the score 432 incorporates a time since the user last viewed the content. In some embodiments, the score 432 may be modified based on user activities. In some embodiments, the score 432 is negatively affected if the user is presented the content in a series of search results, but fails to select the content from the results page. In some embodiments, the score 432 is positively affected when the user visits locations or pages or clicks on results that are similar to the content. Similarity can be determined by a number of well-known techniques (e.g., text classifier, ODP categorization, link structure, URL, edit distance, etc.). In some embodiments, a site is defined as a logically related group of pages, or physically related pages such as pages belonging to the same URL or related URLs. In some embodiments, the score 432 incorporates the number of past queries of the user for which the content was presented (e.g., a higher number of times certain content is presented to the user correlates with a higher score 432). In some embodiments, the score 432 incorporates the number of past queries of the user for which related content was presented (e.g., a higher number of times related content is presented to the user as a result of the user's queries correlates with a higher score 432). In some embodiments, derived data 406 includes aggregate scores. For example, the same query may be generated by the user multiple times and in some embodiments each occurrence will have a different eventID. Accordingly, in some embodiments, an aggregate score is maintained for events that occur multiple times. The aggregate score can be computed by any of a number of different methods. A reference to the multiple events and to the aggregate score can be maintained in the derived data 406.

Figure 5:
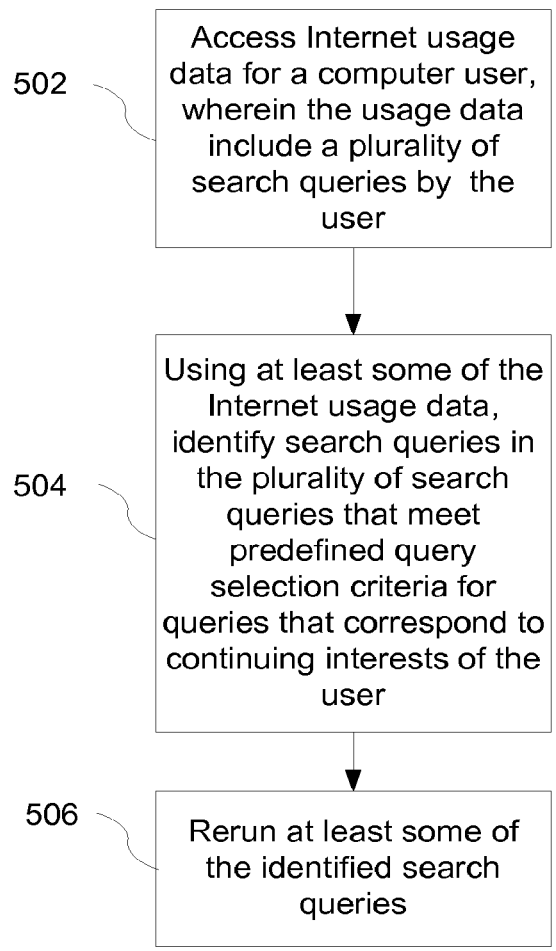
FIG. 5 is a flowchart representing a method of automatically identifying continuing interests of a computer user in accordance with one embodiment of the invention.

FIG. 5 is a flowchart representing a method of automatically identifying continuing interests of a computer user in accordance with one embodiment of the invention. FIG. 5 shows processes performed by search engine 112. It will be appreciated by those of ordinary skill in the art that one or more of the acts described may be performed by hardware, software, or a combination thereof, as may be embodied in one or more computing systems.

In some embodiments, prior to sending Internet usage data for a computer user, client 102 receives login information for the user, such as a username and password, and sends the information to search engine 112 via communications network 106. Search engine 112 receives and verifies the login information, thereby enabling search engine 112 to associate subsequent data received from client 102 (e.g., Internet usage data such as event-based data 404) with a particular user record 400 in user information database 116. In some embodiments, the user may be identified using a cookie stored on the client 102, or by a user identifier that is stored by and associated with a browser toolbar or browser extension. In some embodiments, the user may pre-approve the use of the user's Internet usage data.

Query server 114 in search engine 112 accesses (502) Internet usage data for a computer user (e.g., data in user record 400). The usage data include a plurality of search queries by the user (e.g., queries 421 in query events 410). In some embodiments, the Internet usage data are grouped into query sessions, as described below.

Using at least some of the Internet usage data, query server 114 identifies (504) search queries in the plurality of search queries that meet predefined query selection criteria for queries that correspond to continuing interests of the user. In some embodiments, the identifying of search queries is performed without explicit input from the user identifying search queries that are continuing interests of the user. In some embodiments, the predefined query selection criteria include a score derived from a combination of at least some of the Internet usage data.

To see how the user's Internet usage data can be used to identify the user's continuing interests, consider the sample query session in Table 1.

TABLE 1

Sample Query Session html encode java (8 s)
    * RESULTCLICK (91.00 s) -- 2.
        "http://www.java2html.de/docs/api/de/java2html/util/HTMLTools.html"
    * RESULTCLICK (247.00 s) -- 1. "http://www.javapractices.com/Topic96.cjp"
    * RESULTCLICK (12.00 s) -- 8. "http://www.trialfiles.com/program-16687.html"
    * NEXTPAGE (5.00 s) -- start = 10
        o RESULTCLICK (1019.00 s) -- 12.
            "http://forum.java.sun.com/thread.jspa?threadID=562942..."
        o REFINEMENT (21.00 s) -- html encode java utility
            + RESULTCLICK (32.00 s) -- 7.
                "http://www.javapractices.com/Topic96.cjp"
            o NEXTPAGE (8.00 s) -- start = 10
                * NEXTPAGE (30.00 s) -- start = 20
(Total time: 1473.00 s)

The user initially submitted the query "html encode java"—presumably to find out how to encode html in a java program. After 8 seconds of browsing the search results, she clicks on the second result presented, and remains viewing that page for 91 seconds. She then returns to the results page and views the first result for 247 seconds. Finally, she views the 8th result for 12 seconds. She then performs a next page navigation, meaning that she views the next page of results, starting at position 11. She views the 12th result for a long time—1019 seconds. However, perhaps because she is still unable to find a satisfactory result, she submits the query refinement "html encode java utility"—she is explicitly looking for an existing java utility that will allow her to encode html. After a single result click for 32 seconds, the user looks at the next page of results ranked 11-20, and immediately looks at the following page of results ranked 21-30. She then ends the query session.

How can query server 114 determine whether the user found what she was looking for, and how interested she is in seeing new results? First, it would appear that the user was interested in finding an answer, since she spent a considerable amount of time in the session, viewed a number of pages, and performed a large number of refinements (query refinements, next pages, etc.). Second, query server 114 might also guess that the user did not find what she was looking for, because the session ended with her looking at a number of search results pages, but not actually clicking on anything. Finally, it is not as clear what the duration of the user's information need is. However, because this query topic seems to address a work-related need, query server 114 might guess that the user needs to find a solution immediately, or in the near future. Thus, from this example we can see how query server 114 might determine search queries that correspond to continuing interests with signals such as duration of the session, number of actions, ordering of actions, and so on.

In some embodiments, rather than focusing on individual queries, which may be related to one another, query server 114 evaluates a "query session", i.e., all actions associated with a given initial query. Such actions can include result clicks, spelling corrections, viewing additional pages of results, and query refinements. A query is a "query refinement" of the previous query if both queries contain at least one common term. Here, we will use the term refinement to more broadly refer to spelling corrections, next pages, and query refinements.

If query server 114 evaluates a user's continuing interest in a query session, rather than a specific query, it needs to determine the actual query to make recommendations for. A session may consist of many query refinements, so which should be used? In some embodiments, query server 114 uses the query refinement that is directly followed by the largest number of result clicks. If two or more query refinements are tied (with respect to number of result clicks), then query server 114 chooses the refinement for which the total duration of clicks is longest. For example, in the query session shown in Table 1, query server 114 will register the query "html encode java" because it has four result clicks, while "html encode java utility" has only one.

Query selection criteria that query server 114 can use to identify queries that correspond to continuing interests of the user include, without limitation, the following Internet usage data of the user:

Number of query terms—A larger number of terms tends to indicate a more specific need, which in turn might correlate with shorter interest duration and lower likelihood of prior fulfillment.

Number of clicks and number of refinements—The more actions a user takes on behalf of a query (e.g., clicks on query results), the more interested she is likely to be in the query. In addition, a high number of refinements probably implies low likelihood of prior fulfillment.

History match score—If a query matches the interests displayed by a user through past queries and clicks, then interest level is probably high. A history match score may be generated in a number of ways, such as that described by Sugiyama, Hatano, and Yoshikawa in "Adaptive web search based on user profile constructed without any effort from users" in Proc. of WWW, 2004.

Navigational queries—A navigational query is one in which the user is looking for a specific web site, rather than information from a web page. In some embodiments, it is assumed that if the user clicks on only a single result and makes no subsequent refinements, the query is either navigational, or answerable by a single good website. In this case, there is a high likelihood of prior fulfillment and low interest level.

Repeated non-navigational queries—If a user repeats a query over time, she is likely to be interested in seeing further results. Note, however, that navigational queries which are often repeated, but for which the user does not care to see additional results, should be eliminated. In some embodiments, query server 114 only considers a query that has been repeated, and for which the user has clicked on multiple or different clicks the most recent two times the query was submitted.

Session duration—Longer sessions might imply higher interest.

Query topic-Leisure—related topics such as sports and travel might be more interesting than work-related topics.

Number of "long clicks"—A user might quickly click through many results on a query she is not interested in, so the number of long clicks—where the user views a page for many seconds—may be a better indicator than the number of any kind of click.

Whether the session ended with a refinement—Sessions that end with a refinement may be indicative of queries for which the user would want to see further results.

In some embodiments, an interest score for query sessions is defined that correlates with the continuing interest the user has in a query session. In some embodiments, the interest score is given by:

$$i_{score} = a \cdot \log(\#clicks + \#refinements) + b \cdot \log(\#repetitions) + c \cdot (\text{history match score})$$

where a, b, and c are constants. It should be clear that this score is merely exemplary. Other scores can be constructed where higher score values correlate with higher continuing user interest. In some embodiments, the predefined query selection criteria for queries that correspond to continuing interests of the user may require that the interest score be above a threshold value.

In some embodiments, Boolean criteria (e.g., threshold conditions) are not incorporated into the interest score, but can still be used as part of the query selection criteria.

Query server 114 reruns (506) at least some of the identified search queries. In some embodiments, the rerunning is performed automatically by search engine 112 at predefined times. In some embodiments, the predefined times include the times of periodic events (e.g., monthly, weekly, daily, twice per day, hourly, or the like) or the times of episodic events (e.g., in response to the occurrence of any one of a predefined set of trigger conditions, such as when the user logs in to the search engine or to another server or service).

Figure 6:
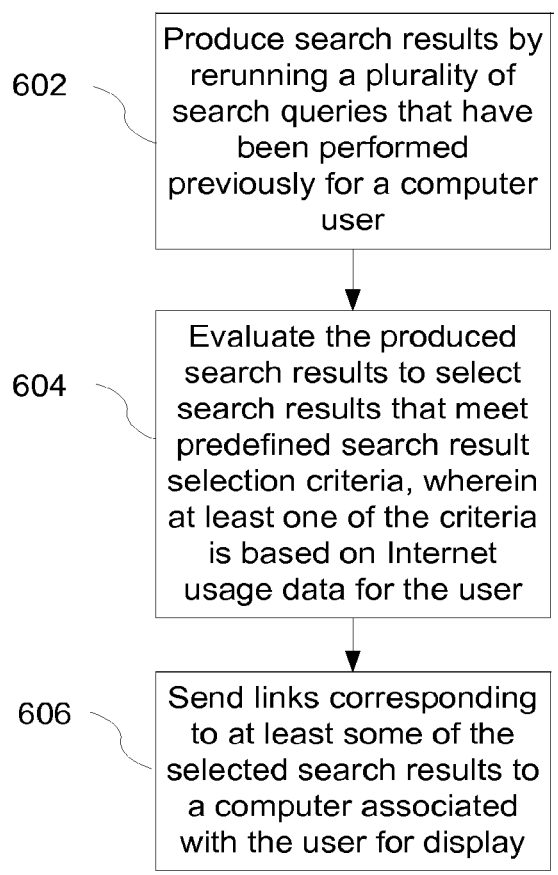
FIG. 6 is a flowchart representing a method of alerting a computer user to new results for a prior search in accordance with one embodiment of the invention.

FIG. 6 is a flowchart representing a method of alerting a computer user to new results for a prior search in accordance with one embodiment of the invention. FIG. 6 shows processes performed by search engine 112. It will be appreciated by those of ordinary skill in the art that one or more of the acts described may be performed by hardware, software, or a combination thereof, as may be embodied in one or more computing systems.

Prior to sending Internet usage data for a computer user, client 102 receives login information for the user, such as a username and password, and sends the information to search engine 112 via communications network 106. Search engine 112 receives and verifies the login information, thereby enabling search engine 112 to associate subsequent data received from client 102 (e.g., Internet usage data such as event-based data 404) with a particular user record 400 in user information database 116. In some embodiments, the user may pre-approve the use of the user's Internet usage data.

Query server 114 in search engine 112 produces (602) search results by rerunning a plurality of search queries that have been performed previously for a computer user (e.g., one or more of the queries 421 in query events 410 in user record 400).

Query server 114 evaluates (604) the produced search results to select search results that meet predefined search result selection criteria. At least one of the criteria is based on Internet usage data for the user (e.g., data such as event-based data 404 for the user). In some embodiments, the criteria include a requirement that selected search results are not present in query event data 410 for the user. In some embodiments, the criteria include a requirement that selected search results are not present in the Internet usage data for the user. In some embodiments, the predefined search result selection criteria identify search results deemed likely to be relevant to the computer user.

Exemplary search result selection criteria may include, without limitation:

History presence—In some embodiments, some or all the URLs sent to a user for her past queries are stored, for example in user record 400. If a page appears in this history, it is not selected. In some embodiments, if a page appears anywhere in the user record (e.g., as a contentID 422 in user record 400), it is not selected. In some embodiments, to err on the side of high precision but low recall, a URL from any domain the user has seen is not recommended.

Rank—If a result R is ranked very highly by a search engine, it may be concluded that R is a good page relative to other results for the query. In addition, if it is also a new result, this indicates that the result R is new or was recently promoted.

Popularity and relevance (PR) score—Results for keyword queries are assigned relevance scores based on the relevance of the document to the query—for example, by term frequency inverse document frequency (TFxIDF) analysis, anchor text analysis, etc. In addition, major search engines utilize static scores, such as PageRank, that reflect the query-independent popularity of the page. The higher the absolute values of these scores, the better a result should be.

Above Dropoff—If the PR scores of a few results are much higher than the scores of all remaining results, these top results might be authoritative with respect to this query. In some embodiments, a result R is "above the dropoff" if there is a 30% PR score dropoff between two consecutive results in the top 5, and if R is ranked above this dropoff point. This dropoff formula is merely exemplary. Analogous formulas can be used to create other dropoff criteria.

Days elapsed since query submission—This selection criterion is based on the hypothesis that the more days that have elapsed since the query was submitted, the more likely it is for interesting new results to exist. However, to date this criterion has not effected the recommendation quality.

Sole changed result—This criterion refers to a result that is the only new result in the top N results, where N is an integer (e.g., N=6). This selection criterion is based on the hypothesis that such results are not a product of rank fluctuation. However, to date this criterion has been inversely correlated with recommendation quality.

All poor signal—This criterion refers to when all top N results (e.g., N=10) for a query have PR scores below a threshold value. This selection criterion is based on the hypothesis that if every result for a query has low score, then the query has no good pages to recommend.

In some embodiments, a quality score for the search results is defined that correlates with search results deemed likely to be relevant to the computer user. In some embodiments, the quality score is given by:

$$q_{score} = a \cdot (\text{PR score}) + b \cdot (\text{rank})$$

where a and b are constants

In some embodiments, because initial data indicated that rank may be inversely correlated with relevance to the user, the quality score is given by:

$$q_{score}^* = c \cdot (\text{PR score}) + d \cdot (1/\text{rank})$$

where c and d are constants,

It should be clear that these quality scores are merely exemplary. Other scores can be constructed where higher score values correlate with higher likelihood of relevance to the user. In some embodiments, the predefined result selection criteria for results that correspond to relevant new pages to the user may require that the quality score be above a threshold value.

In some embodiments, Boolean criterion (e.g., "above dropoff", whether the PR scores were above a threshold value, and/or whether the new result appeared in the top N (e.g., N=3)) are not incorporated into the quality score, but can still be used as part of the result selection criteria.

Query server 114 sends (608) links corresponding to at least some of the selected search results to a computer associated with the user for display, such as the client 102 that the user has used for login. In some embodiments, the links are sent without explicit input from the user requesting the selected search results.

Figure 7:
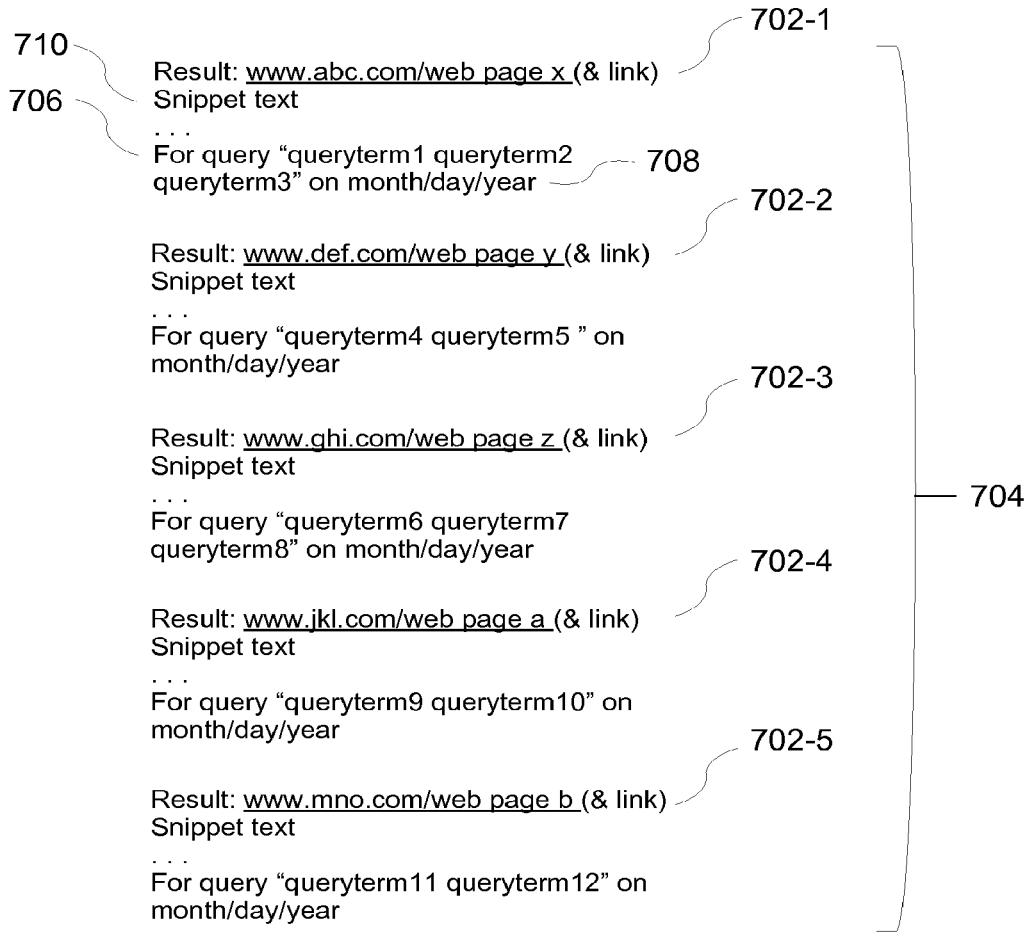
FIG. 7 is a schematic screen shot of an exemplary graphical user interface for alerting a computer user to new results for a prior search in accordance with one embodiment of the invention.

FIG. 7 is a schematic screen shot of an exemplary graphical user interface 700 for alerting a computer user to new results for a prior search in accordance with one embodiment of the invention. In some embodiments, GUI 700 includes a plurality 704 of links 702 recommended by a search engine for a computer user. The plurality 704 of links 702 are determined by the search engine by: producing search results by rerunning a plurality of search queries that have been performed previously for the computer user; and evaluating the produced search results to select search results that meet predefined search result selection criteria. At least one of the criteria is based on Internet usage data for the user.

In some embodiments, the links 702 are displayed in a web page that is separate from a search result web page. In some embodiments, the links 702 are displayed in a search result history web page. In some embodiments, the links 702 are displayed in a web page (e.g., a home web page, login splash page or other web page) personalized to the user. In some embodiments, the links 702 are part of an RSS feed and are displayed using an RSS reader or other compatible interface. In some embodiments, information about the previous query (e.g., the query terms 706 and the date of the previous query 708) is displayed near the corresponding recommended link 702 so that the user can recognize the context for the recommendation. In some embodiments, there is a link (e.g., one or more of query terms 706) that the user can click on to re-run the corresponding previous query. In some embodiments, additional information about the new search result, such as a snippet 710 of text from the new result, is displayed near the corresponding recommended link 702 to help the user decide whether to click on the link.

Query server 114 will also receive implicit user feedback in the form of clicks on recommended links. Such data can be incorporated into a feedback loop to refine and adjust subsequent recommendations.

Figure 8:
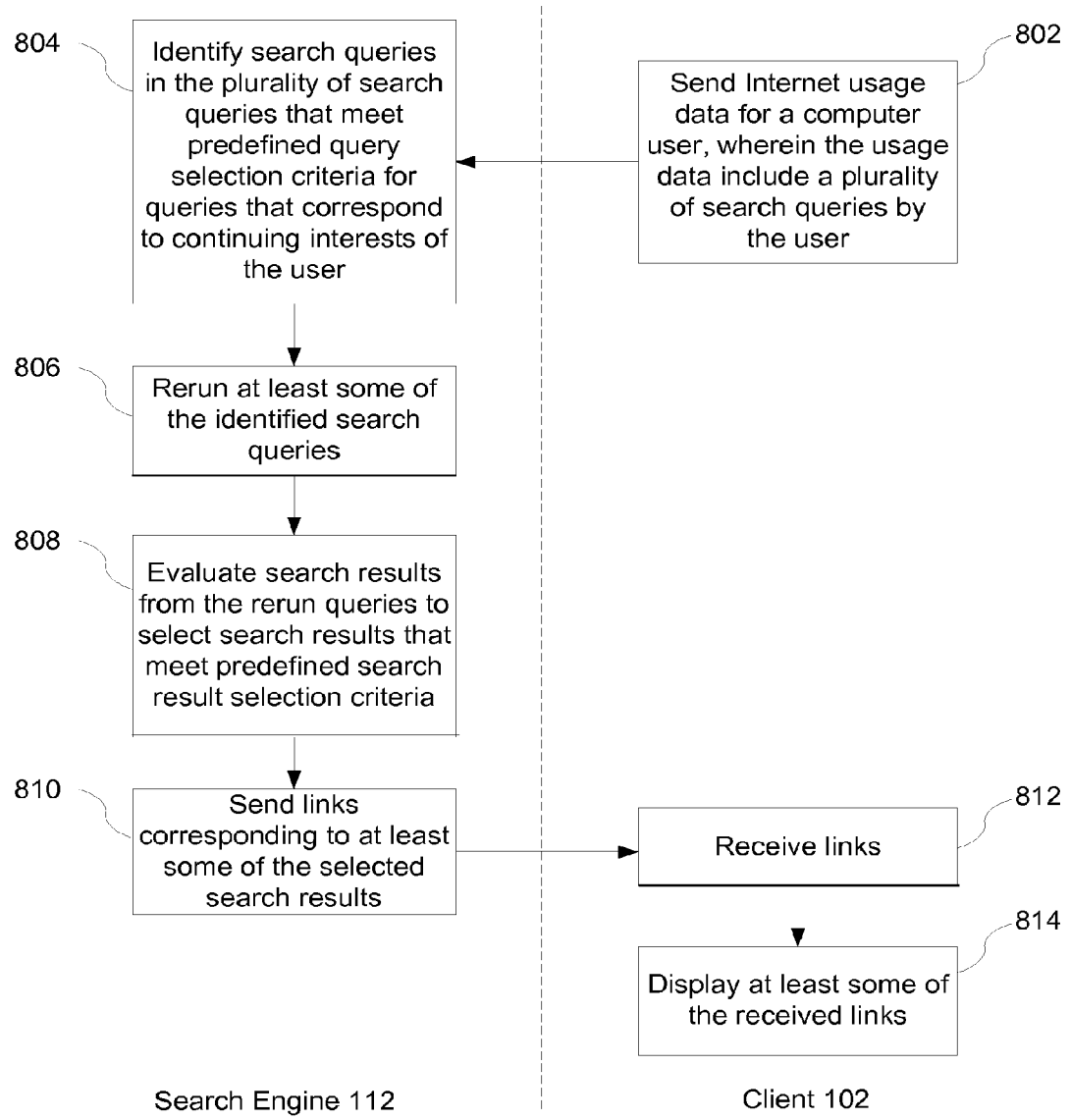
FIG. 8 is a flowchart representing a method of automatically identifying continuing interests of a computer user and alerting the user to new results for a prior search in accordance with one embodiment of the invention.

FIG. 8 is a flowchart representing a method of automatically identifying continuing interests of a computer user and alerting the user to new results for a prior search in accordance with one embodiment of the invention. FIG. 8 shows processes performed by search engine 112 and client 102. It will be appreciated by those of ordinary skill in the art that one or more of the acts described may be performed by hardware, software, or a combination thereof, as may be embodied in one or more computing systems. In some embodiments, portions of the processes performed by search engine 112 can be performed by client 102 using components analogous to those shown for search engine 112 in FIG. 2.

Prior to sending Internet usage data for a computer user, client 102 receives login information for the user, such as a username and password, and sends the information to search engine 112 via communications network 106. Search engine 112 receives and verifies the login information, thereby enabling search engine 112 to associate subsequent data received from client 102 (e.g., Internet usage data such as event-based data 404) with a particular user record 400 in user information database 116. In some embodiments, the user may pre-approve the use of the user's Internet usage data.

Client 102 sends (802) Internet usage data for a computer user to a server computer, such as query server 114 in search engine 112, via communications network 106. The Internet usage data include a plurality of search queries by the user (e.g., queries 421 in query events 410). In some embodiments, the Internet usage data include one or more of: the top N search results produced in response to each search query, and click data indicating users selections (clicks) of search results and URL visit duration times of the user on each user selected search result. In some embodiments, the Internet usage data are grouped into query sessions. In some embodiments, client 102 is the computer used by the user to enter login information for the search engine 112. In some embodiments, the user has previously registered with the search engine 112.

Accessing and using at least some of the Internet usage data, query server 114 identifies (804) search queries in the plurality of search queries that meet predefined query selection criteria for queries that correspond to continuing interests of the user. In some embodiments, the identifying of search queries is performed without explicit input from the user identifying search queries that are continuing interests of the user. In some embodiments, the predefined query selection criteria include a score derived from a combination of at least some of the Internet usage data.

Query server 114 reruns (806) at least some of the identified search queries. In some embodiments, the rerunning is performed automatically by search engine 112 at predefined times. In some embodiments, the predefined times include the times of periodic events (e.g., monthly, weekly, daily, twice per day, hourly, or the like) or the times of episodic events (e.g., in response to the occurrence of any one of a predefined set of trigger conditions, such as when the user logs in).

Query server 114 evaluates (808) search results from the rerun queries to select search results that meet predefined search result selection criteria. In some embodiments, the predefined search result selection criteria identify search results deemed likely to be relevant to the computer user.

Query server 114 sends (810) links corresponding to at least some of the selected search results to a computer associated with the user for display, such as the client 102 that the user has used for login. In some embodiments, the links are sent without explicit input from the user requesting the selected search results. In some instances, only the X highest ranked links are sent, where X is an integer (e.g., a number between 1 and 10) that is either predefined or chosen based on various system features (e.g., the type of client device, or the size of the display or display region in which the response is to be shown) or user preferences.

Client 102 receives (812) links corresponding to at least some of the selected search results from query server 114 and displays (814) at least some of the received links (e.g., as shown in FIG. 7). In some embodiments, the links 702 are displayed in a web page that is separate from a search result web page. In some embodiments, the links 702 are displayed in a search result history web page. In some embodiments, the links 702 are displayed in a web page (e.g., a home web page, login splash page or other web page) personalized to the user. In some embodiments, the links 702 are part of an RSS feed and are displayed using an RSS reader or other compatible interface. In some embodiments, information about the previous query (e.g., the query terms 706 and the date of the previous query 708) is displayed near the corresponding recommended link 702 so that the user can recognize the context for the recommendation. In some embodiments, additional information about the new search result, such as a snippet 710 of text from the new result, is displayed near the corresponding recommended link 702 to help the user decide whether to click on the link.

Query server 114 will also receive implicit user feedback in the form of clicks on recommended links. Such data can be incorporated into a feedback loop to refine and adjust subsequent recommendations.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising:
   obtaining a particular search query that was previously submitted by a user of a search system;
   classifying, using one or more predetermined criteria, the particular search query as a search query that did not produce a search result that the user was looking for;
   adding the particular search query that is classified as a search query that did not produce a search result that the user was looking for to a collection of search queries that are periodically evaluated for automatic resubmission to the search system;
   automatically resubmitting the particular search query to the search system for the user; and
   obtaining an updated set of search results.

2. The method of claim 1,
   wherein the one or more predetermined criteria include a number of query terms of the particular search query, and wherein classifying the particular search query as a search query that did not produce a search result that the user was looking for comprises determining that the number of query terms of the particular search query does not satisfy a threshold.

3. The method of claim 1,
wherein the one or more predetermined criteria include a number of selections of search results corresponding to the particular search query, and
wherein classifying the particular search query as a search query that did not produce a search result that the user was looking for comprises determining that the number of clicks of search results corresponding to the particular search query satisfies a threshold.

4. The method of claim 1, wherein classifying, using one or more predetermined criteria, the particular search query as a search query that did not produce a search result that the user was looking for comprises determining a quantity of search results that a user has (i) selected and (ii) viewed for more than a predetermined amount of time.

5. The method of claim 1,
wherein the one or more predetermined criteria include whether the particular search query matches a past search query submitted by the user, and
wherein classifying the particular search query as a search query that did not produce a search result that the user was looking for comprises determining that the particular search query matches the past search query.

6. The method of claim 1,
wherein the one or more predetermined criteria include a number of times that the user has submitted the particular search query in the past, and
wherein classifying the particular search query as a search query that did not produce a search result that the user was looking for comprises determining that the number of times that the user has submitted the particular search query in the past satisfies a threshold.

7. The method of claim 1,
wherein the one or more predetermined criteria include a duration of a search session associated with the particular search query, and
wherein classifying the particular search query as a search query that did not produce a search result that the user was looking for comprises determining that the duration of the search session associated with the particular search query satisfies a threshold.

8. The method of claim 1,
wherein the one or more predetermined criteria include a topic associated with the particular search query, and
wherein classifying the particular search query as a search query that did not produce a search result that the user was looking for comprises determining that the topic associated with the particular search query matches with a topic that is predetermined as an interest to one or more users including the user that submitted the particular search query.

9. The method of claim 1,
wherein classifying the particular search query as a search query that did not produce a search result that the user was looking for comprises determining that the particular search query is a refinement search query of another search query submitted by the user.

10. The method of claim 1,
wherein classifying the particular search query as a search query that did not produce a search result that the user was looking for comprises:

obtaining a score using the one or more predetermined criteria; and
determining that the score satisfies a threshold.

11. The method of claim 1, comprising:
providing a search results page that includes a subset of the updated set of search results to the user.

12. A non-transitory computer-readable medium storing software having stored thereon instructions, which, when executed by one or more computers, cause the one or more computers to perform operations of:
obtaining a particular search query that was previously submitted by a user of a search system;
classifying, using one or more predetermined criteria, the particular search query as a search query that did not produce a search result that the user was looking for;
adding the particular search query that is classified as a search query that did not produce a search result that the user was looking for to a collection of search queries that are periodically evaluated for automatic resubmission to the search system;
automatically resubmitting the particular search query to the search system for the user; and
obtaining an updated set of search results.

13. The computer-readable medium of claim 12,
wherein the one or more predetermined criteria include a number of query terms of the particular search query, and
wherein classifying the particular search query as a search query that did not produce a search result that the user was looking for comprises determining that the number of query terms of the particular search query does not satisfy a threshold.

14. The computer-readable medium of claim 12,
wherein the one or more predetermined criteria include a number of selections of search results corresponding to the particular search query, and
wherein classifying the particular search query as a search query that did not produce a search result that the user was looking for comprises determining that the number of clicks of search results corresponding to the particular search query satisfies a threshold.

15. The computer-readable medium of claim 12,
wherein the one or more predetermined criteria include whether the particular search query matches a past search query submitted by the user, and
wherein classifying the particular search query as a search query that did not produce a search result that the user was looking for comprises determining that the particular search query matches the past search query.

16. The computer-readable medium of claim 12, wherein the operations comprise:
providing a search results page that includes a subset of the updated set of search results to the user.

17. A system comprising:
one or more processors and one or more computer storage media storing instructions that are operable, when executed by the one or more processors, to cause the one or more processors to perform operations comprising:
obtaining a particular search query that was previously submitted by a user of a search system;
classifying, using one or more predetermined criteria, the particular search query as a search query that did not produce a search result that the user was looking for;
adding the particular search query that is classified as a search query that did not produce a search result that the user was looking for to a collection of search queries that are periodically evaluated for automatic resubmission to the search system;

automatically resubmitting the particular search query to the search system for the user; and obtaining an updated set of search results.

18. The system of claim 17, wherein the one or more predetermined criteria include a number of query terms of the particular search query, and wherein classifying the particular search query as a search query that did not produce a search result that the user was looking for comprises determining that the number of query terms of the particular search query does not satisfy a threshold.

19. The system of claim 17, wherein the one or more predetermined criteria include a number of selections of search results corresponding to the particular search query, and wherein classifying the particular search query as a search query that did not produce a search result that the user was looking for comprises determining that the number of clicks of search results corresponding to the particular search query satisfies a threshold.

20. The system of claim 17, wherein the operations comprise:

providing a search results page that includes a subset of the updated set of search results to the user.

21. A non-transitory computer-readable medium storing software having stored thereon instructions, which, when executed by one or more computers, cause the one or more computers to perform operations of:

accessing Internet usage data for a particular individual computer user, wherein the usage data include a plurality of search queries previously submitted by the particular individual computer user;

identifying, without human intervention by the particular individual computer user, from at least some of the Internet usage data, a search query previously submitted by the particular individual computer user that meets one or more predefined query selection criteria;

automatically rerunning, without human intervention by the particular individual computer user, the identified search query in its entirety, wherein the identified search query is a search query previously submitted by the particular individual computer user; and sending at least some search results from the rerun query to a computer associated with the particular individual computer user for display.

22. A non-transitory computer-readable medium storing software having stored thereon instructions, which, when executed by one or more computers, cause the one or more computers to perform operations of:

sending Internet usage data for a particular individual computer user to a server computer, wherein the usage data include a plurality of search queries previously submitted by the particular individual computer user;

receiving a set of search results in accordance with an automatic re-run of a particular search query of the plurality of search queries in its entirety;

wherein the identified search query is a search query previously submitted by the particular individual computer user;

wherein the particular search query is identified, without human intervention by the particular individual computer user, from the plurality of search queries, and meets one or more predefined query selection criteria; and wherein the automatic re-run of the particular search query is without human intervention by the particular individual computer user; and displaying at least one search result of the set of search results.

* * * * *